United States Patent
Kobayashi et al.

(10) Patent No.: US 6,331,969 B1
(45) Date of Patent: Dec. 18, 2001

(54) FOR RECORDING BY MODULATING THE WIDTH OF PITS IN ACCORDANCE WITH A PREDEFINED INFORMATION STREAM

(75) Inventors: Seiji Kobayashi, Kanagawa; Toshihiro Fujiki, Tokyo, both of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/213,012

(22) Filed: Dec. 16, 1998

(30) Foreign Application Priority Data

Dec. 18, 1997 (JP) .................................................. 9-348387

(51) Int. Cl.[7] .................................................. G11B 7/00
(52) U.S. Cl. .................................. 369/275.3; 369/275.4; 369/53.21
(58) Field of Search ........................... 369/275.1, 275.3, 369/275.4, 32, 116, 47.27, 124.14, 53.26, 47.12, 53.21; 380/4.9, 19.2; 84/601, 660, 610, 625, 645, 665, 650

(56) References Cited

U.S. PATENT DOCUMENTS

| | | | |
|---|---|---|---|
| 5,286,907 | * 2/1994 | Okamura et al. | 84/601 |
| 5,557,592 | * 9/1996 | Kobayashi et al. | 369/48 |
| 5,570,339 | * 10/1996 | Nagano | 369/275.3 |
| 5,818,812 | * 10/1998 | Moribe et al. | 369/275.1 |
| 5,930,209 | * 7/1999 | Spitzenberger et al. | 369/32 |
| 5,940,505 | * 8/1999 | Kanamaru | 380/4 |
| 5,956,313 | * 9/1999 | Maegawa et al. | 369/116 |

* cited by examiner

Primary Examiner—David Hudspeth
Assistant Examiner—Kim-Kwok Chu
(74) Attorney, Agent, or Firm—Frommer Lawrence & Haug LLP; William S. Frommer; Gordon Kessler

(57) ABSTRACT

Sub data SC1 is recorded by changing a width of a pit or a mark at a timing which does not effect influence on positional information of an edge by which in respect of an optical disk recording apparatus, an optical disk recording method, an optical disk and an optical disk reproduction apparatus according to the present invention, a sub data row can be recorded reproducibly by an optical pick up for reproducing a main data row without effecting any influence on reproduction of a main data row constituted by a pit row or a mark row.

28 Claims, 9 Drawing Sheets

FOR RECORDING BY MODULATING THE WIDTH OF PITS IN ACCORDANCE WITH A PREDEFINED INFORMATION STREAM

BACKGROUND OF THE INVENTION

1. Field of the Invention

The present invention relates to an optical disk recording apparatus, an optical disk recording method, an optical disk and an optical disk reproduction apparatus, which are applicable to an apparatus of fabricating a compact disk, a compact disk and a compact disk player. According to the present invention, at a timing which does not effect influence on positional information of edge, by changing a width of a pit or a mark, without effecting influence on reproduction of a main data row constituted by a pit row or a mark row, a sub data row can be recorded reproducibly by an optical pick up for reproducing the main data row.

2. Description of Related Art

Conventionally, according to a compact disk, by subjecting a data row for recording to EFM modulation (Eight to Fourteen Modulation) after subjecting the data row to data processing, in respect of a predetermined basic period T, a pit row of 3T through 11T is formed by which audio data or the like is recorded.

In contrast thereto, at a lead in area on an inner peripheral side thereof, a record region of data for control is formed and by TOC (Table of Contents) recorded at this record region, desired musical play or the like can selectively be reproduced.

In this way, according to a compact disk recorded with various data, only an inner peripheral side of a lead in area, codes indicating maker, place of fabrication, disk number and so on are inscribed by which history or the like of the compact disk can be confirmed by optical observation.

In the meantime, according to such an inscription, it seems that by being able to confirm the history of the compact disk, an illegal copy can be identified by presence or absence of the inscription. However, the inscription is provided with a drawback in which it is difficult to reproduce the inscription by an optical pick up of a compact disk player since confirmation by optical observation is aimed at. Accordingly, when an illegal copy is identified by an inscription, after all, an exclusive reproduction mechanism is separately needed for reproducing the inscription.

In this case, it seems that when the above information reproducible by an optical pick up for reproducing audio data can be recorded without effecting influence on reproduction of audio data constituted by a pit row, an illegal copy can be excluded by utilizing the subcode.

SUMMARY OF THE INVENTION

The present invention has been carried out in consideration of the above-described point and it is an object of the present invention to propose an optical disk recording apparatus, an optical disk recording method, an optical disk formed thereby and an optical disk reproduction apparatus for reproducing the optical disk capable of recording sub information reproducibly by an optical pick up for reproducing data constituted by a pit row or the like without effecting influence on reproduction of data constituted by a pit row or the like.

In order to resolve such a problem, according to the present invention, in application of an optical disk recording apparatus and an optical disk recording method, with respect to a pit or a mark having a predetermined length or longer, a width of the pit or the mark is varied at a timing separated by a predetermined distance from a timing in correspondence with an edge of the pit or the mark based on a subcode.

Further, in application to an optical disk, with respect to a pit or a mark having a predetermined length or longer, a width of the pit or the mark is modulated at a modulating portion separated from an edge by a predetermined distance and a sub data row is recorded.

Further, in application to an optical reproduction apparatus, a signal level of a reproduction signal is detected to thereby provide a result of detecting the signal level, an average value of the result of detecting the signal level is identified and a sub data row is reproduced.

In application to an optical disk recording apparatus and an optical disk recording method, with respect to a pit or a mark having a predetermined length or longer, when a width of the pit or the mark is varied at a timing separated by a predetermined distance from a timing in correspondence with an edge of the pit or the mark based on a subcode, sub data can be recorded by the width of the pit or the mark without effecting influence on reproduction in respect of the timing of the edge of the pit or the mark. In this way, subcode can be recorded reproducibly by an optical pick up for reproducing data constituted by the pit row or the like without effecting any influence on the reproduction of data constituted by the pit row or the like.

Further, in application to an optical disk, with respect to a pit or a mark having a predetermined length or longer, when a width of the pit or the mark is modulated at a modulating portion separated from an edge by a predetermined distance and a sub data row is recorded, there can be provided an optical disk recorded with subcode by the width of the pit or the mark without effecting influence on reproduction in respect of a timing of the edge of the pit or the mark.

Further, in application to an optical disk reproduction apparatus, when a signal level of a reproduction signal is detected to thereby provide a result of detecting the signal level, an average value of the result of detecting the signal level is identified and a sub data row is reproduced, in addition to a constitution of reproducing main data recorded by pits or marks, subcode recorded by the width of the pit or the mark can be reproduced.

BRIEF DESCRIPTION OF THE DRAWINGS

FIGS. 2A-1, 2A-2, 2B, 2C and 2D are time charts showing a relationship between frame and frame synchronization;

FIGS. 9A-1, 9A-2, 9B, 9C and 9D are time charts for explaining operation of the disk identifying code reproducing circuit shown by FIG. 8.

DETAILED DESCRIPTION OF THE PREFERRED EMBODIMENTS

A detailed description will be given of embodiments according to the present invention pertinently in reference to the drawings as follows.

(1) First Embodiment (1-1) Constitution of First Embodiment

Figure 1:
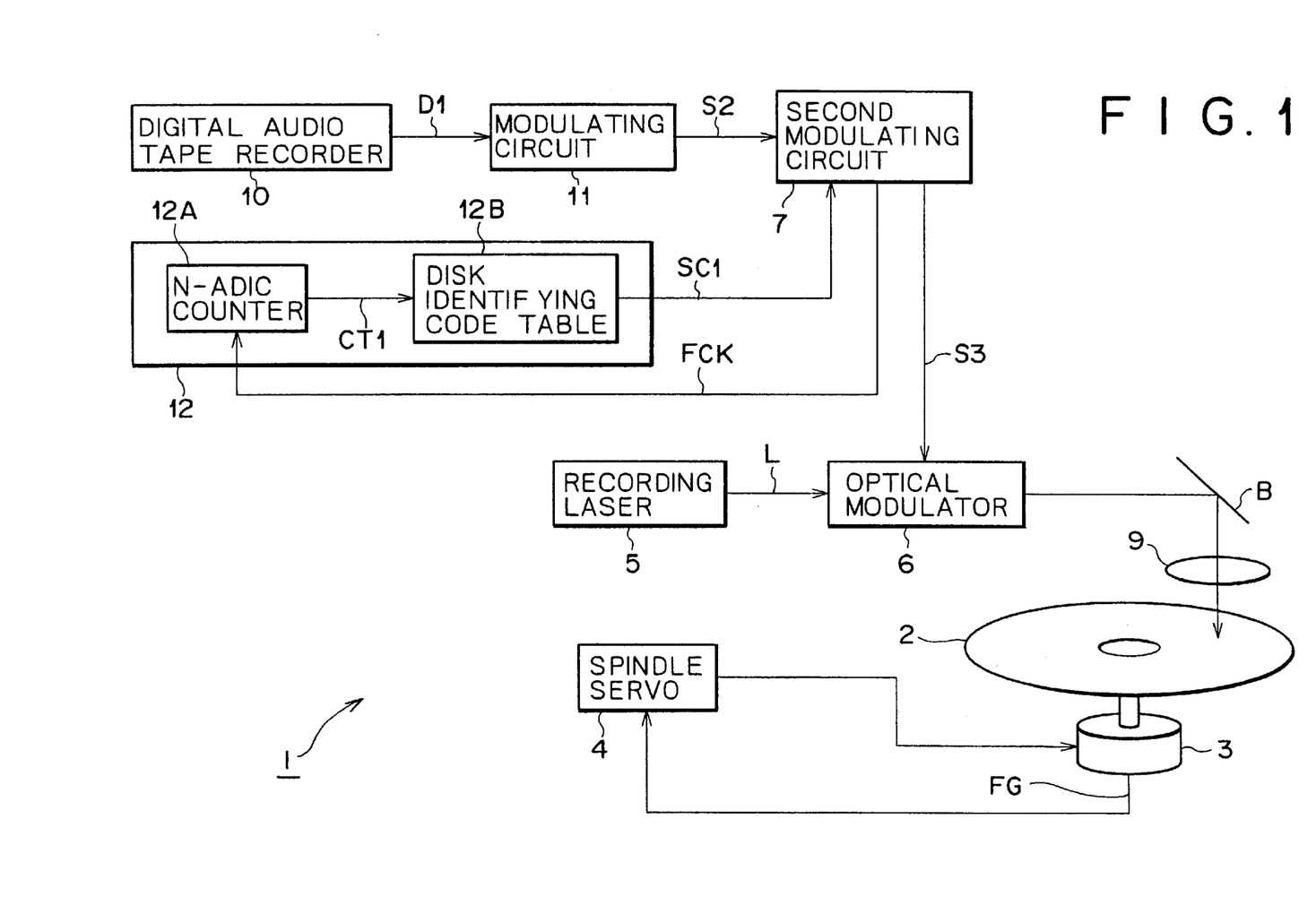
FIG. 1 is a block diagram showing an optical disk recording apparatus according to a first embodiment of the present invention.

FIG. 1 is a block diagram showing an optical disk recording apparatus used in fabricating a compact disk. A compact disk according to the embodiment is fabricated similar to a conventional compact disk except that a disk original board is formed by the optical disk recording apparatus 1.

That is, the compact disk according to the embodiment is formed by successively forming a reflective film, a protective film and so on the disk-like substrate formed by using a stamper. A disk original board 2 exposed by the optical disk recording apparatus 1 is developed and thereafter subjected to electrocasting by which a mother disk is formed and the stamper is formed by using the mother disk.

The disk original board 2 is formed by, for example, coating a photosensitive agent on a flat glass substrate. A spindle motor 3 drives to rotate the disk original board 2 under control of a spindle servo circuit 4. In this case, the spindle motor 3 outputs an FG signal FG by which a signal level rises at every predetermined rotational angle by an FG signal generator installed at a bottom portion thereof. The spindle servo circuit 4 drives the spindle motor 3 such that frequency of the FG signal FG becomes predetermined frequency by which the disk original board 2 is driven to rotate under condition of constant linear velocity.

A recording laser 5 is constituted by a gas laser or the like for emitting laser beam L of a predetermined optical amount. An optical modulator 6 is constituted by an electro-acoustic optical element or the like for emitting the laser beam L incident from the recording laser 5 in an ON/OFF control in accordance with a modulating signal S3 supplied from a second modulating circuit 7.

A mirror 8 bends an optical path of the laser beam L and emits it toward the disk original board 2. An object lens 9 converges reflected beam from the mirror 8 on a record face of the disk original board 2. The mirror 8 and the object lens 9 are constituted to move successively in the radius direction in synchronism with rotation of the disk original board 2 by a thread mechanism not illustrated. Thereby, according to the optical disk recording apparatus 1, a position of converging the laser beam L is displaced successively in, for example, an outer peripheral direction of the disk original board 2 and a track is formed on the disk original board 2 in a spiral shape. Further, in this case, a pit row in accordance with the modulating signal S3 is formed on the track.

A digital audio tape recorder 10 outputs a digital audio signal D1 by a time-sequential arrangement for recording on the disk original board 2. A modulating circuit 11 executes data processing prescribed in respect of the compact disk based on the digital audio signal D1 and sub code data supplied from a sub code generator, not illustrated, and forms an EFM signal S2. That is, the modulating circuit 11 interleaves the audio data D1 and the sub code data after adding an error correction code thereto and forms the EFM signal S2 by subjecting them to EFM modulation.

In this way, according to a conventional optical disk recording apparatus, the EFM signal S2 formed in this way is supplied directly to the optical modulator 6, the laser beam L is controlled in the ON/OFF control by the EFM signal S2 and the disk original board 2 is successively exposed.

In contrast thereto, according to the optical disk recording apparatus 1, during a time period in correspondence with the lead in area, a disk identifying code SC1 is generated by a disk identifying code generating circuit 12 and in the second modulating circuit 7, the EFM signal S2 is modulated by the disk identifying code SC1 and is outputted to the optical modulator 6.

In this case, a disk identifying code SC1 is constituted by, for example, ID (Identification) information, information with respect to a fabrication factory, day, month and year of fabrication, information for controlling copiable/noncopiable of the disk and so on which are inherently set to each disk original board. Further, the disk identifying code generating circuit 12 successively outputs a synchronizing signal representing start of the disk identifying code SC1 and an error correction code of the disk identifying code SC1 in addition to the disk identifying code SC1.

Figure 2A:
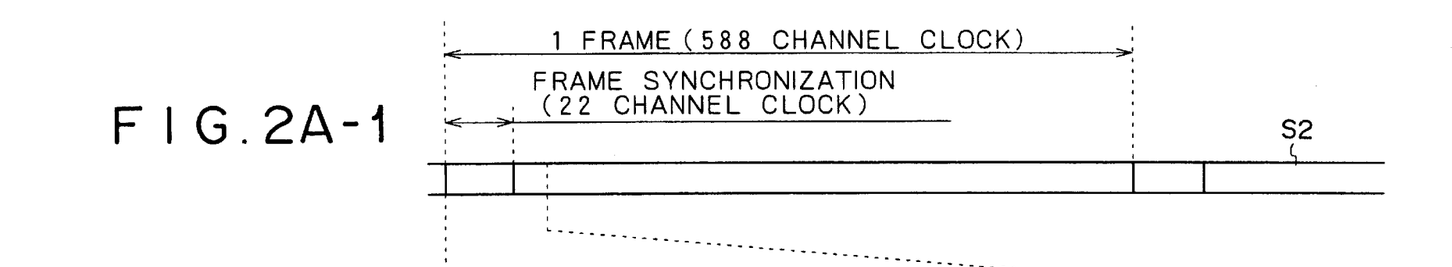
Figure 2A:
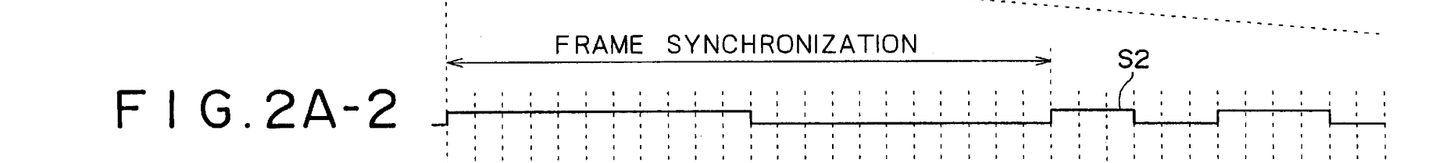
Figure 2B:
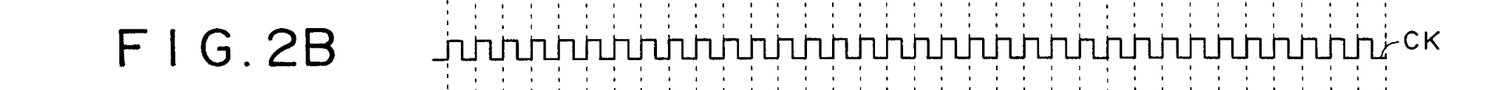
Figure 2C:
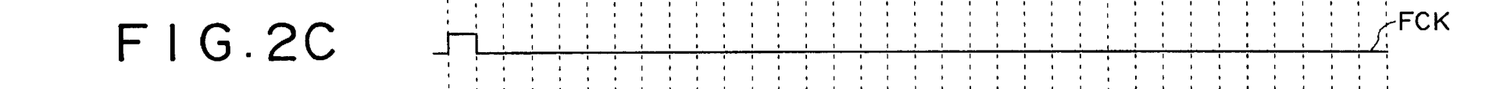
Figure 2D:
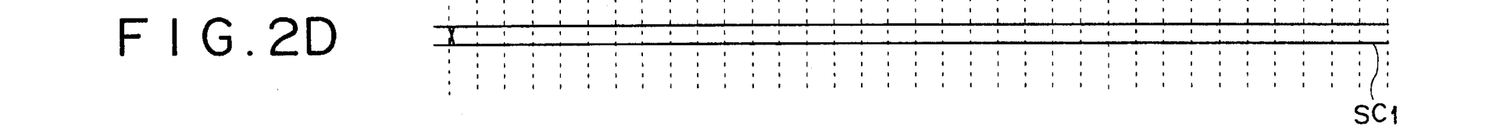

That is, in the disk identifying code generating circuit 12, an N-adic counter 12A is constituted by a ring counter for counting frame clock FCK outputted from the second modulating circuit 7 and outputting a count value CT1. In this case, as shown by FIGS. 2A-1, 2A-2, 2B, 2C and 2D, the frame of the EFM signal S2 (FIG. 2A-1 and FIG. 2A-2) is constituted by inserting frame synchronization of 22 channel clocks to each of 188 channel clock by the modulating circuit 11. The frame clock FCK is formed such that the signal level is made to rise by 1 clock period at a timing of starting the frame synchronization (FIG. 2B and FIG. 2C). Thereby, the N-adic counter 12A counts successively the frame with the frame synchronization as a reference and outputs a result of counting.

A disk identifying code table 12B is constituted by a read only memory circuit for holding pit information by the disk identifying code SC1 for outputting held data with the count value CT1 as an address input. At this occasion, the disk identifying code table 12B outputs held data by pit information (FIG. 2D) by which data of 1 bit is successively allocated to one frame and is outputted.

The second modulating circuit 7 modulates the EFM signal S2 by the disk identifying code SC1 and forms the modulating signal S3 comprising a so-to-speak double modulating signal.

Figure 3:
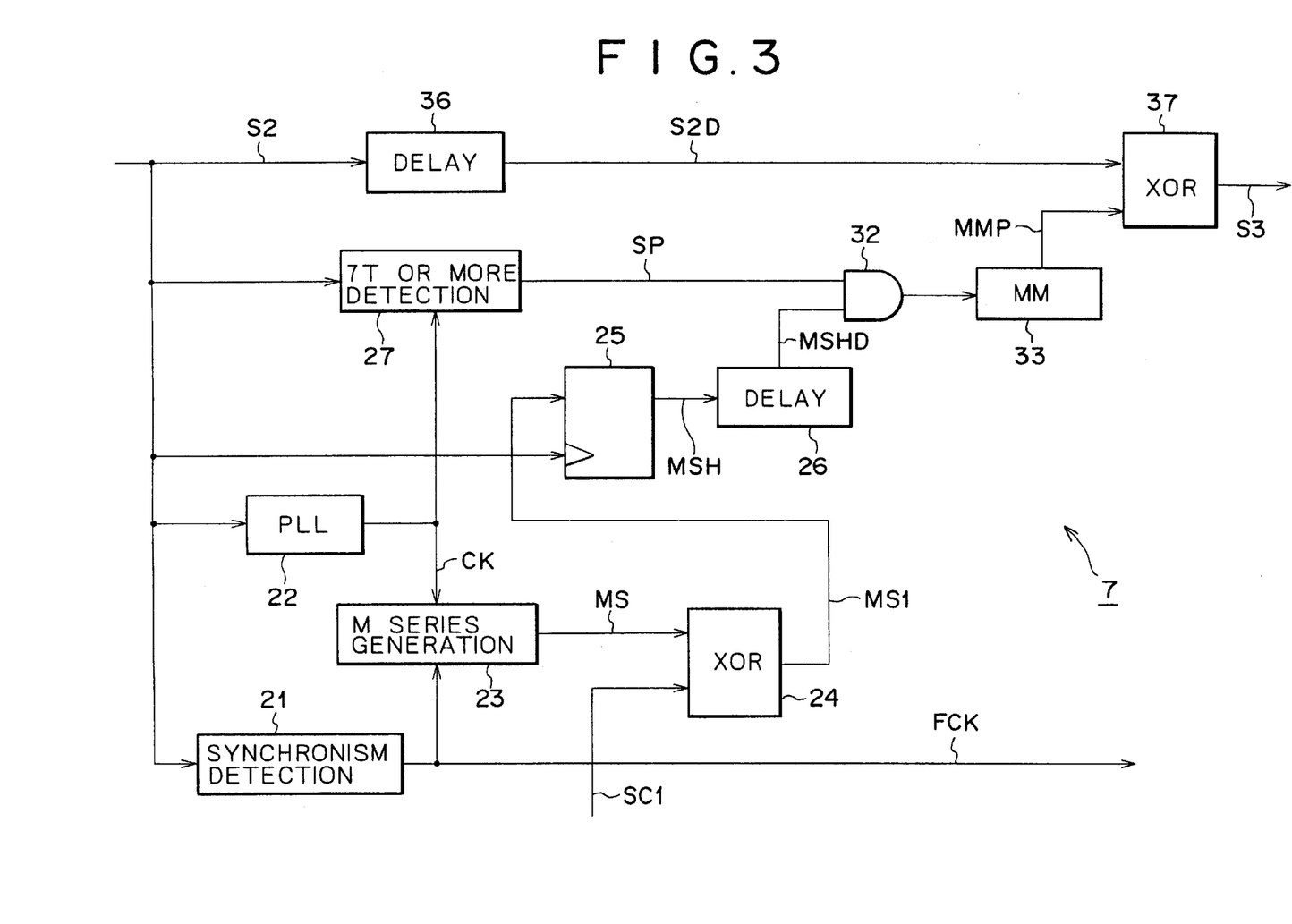
FIG. 3 is a block diagram showing a second modifying circuit of FIG. 1.

FIG. 3 is a block diagram showing in details the second modulating circuit 7. In the second modulating circuit 7, a synchronism detecting circuit 21 detects frame synchronization from the EFM signal S2 and outputs the frame clock FCK.

Figure 4A:
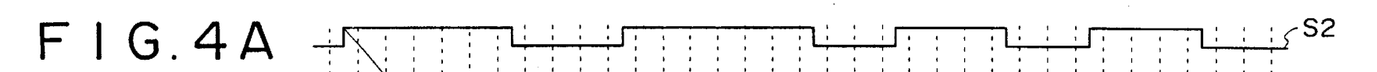
FIGS. 4A, 4B, 4C, 4D, 4E, 4F, 4G, 4H and 4I are time charts for explaining operation of the second modulating circuit of FIG. 3.
Figure 4B:
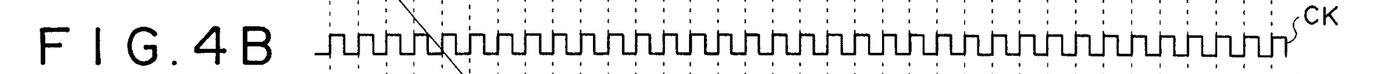
Figure 4C:
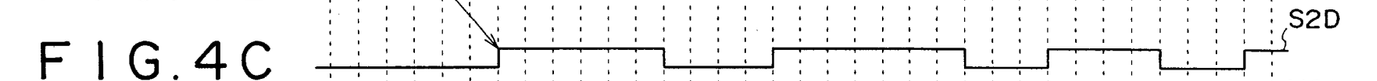

As shown by FIGS. 4A, 4B, 4C, 4D, 4E, 4F, 4G, 4H and 4I, a PLL (Phase Lock Loop) circuit 22 reproduces and outputs the channel clock CK (FIG. 4B) by the EFM signal S2 (FIG. 4A). An M series generating circuit 23 is constituted by a plurality of flip-flops and exclusive OR circuits which are continuously connected for setting initial values of the plurality of flip-flops with the frame clock FCK as a reference, thereafter transmitting successively set content in synchronism with the channel clock CK and feeding back signals between predetermined stages by which random number data MS of an M series in which logic 1 and logic 0 emerge with equal probabilities, is formed. Thereby, the M series signal MS constitutes quasi random numbers repeating the same pattern with a period of 588 channel clocks (period of 1 frame).

Figure 4D:
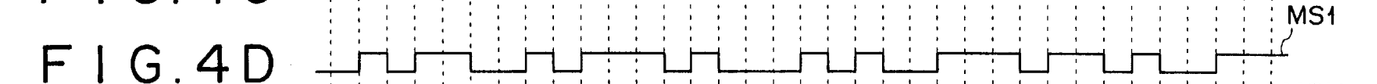

An exclusive OR circuit (XOR) 24 receives the M series signal MS and the disk identifying code SC1 and outputs an exclusive OR signal MS1 (FIG. 4D). That is, the exclusive OR circuit 24 outputs an exclusive OR signal MS1 by a logical level of the M series signal MS when the disk identifying code SC1 constitutes logic 0 and outputs an exclusive OR signal MS1 which is constituted by reverting the logical level of the M series signal MS when the disk identifying code SC1 constitutes logic 1. Thereby, the exclusive OR circuit 24 modulates the disk identifying code SC1 by the M series random number.

Figure 4E:
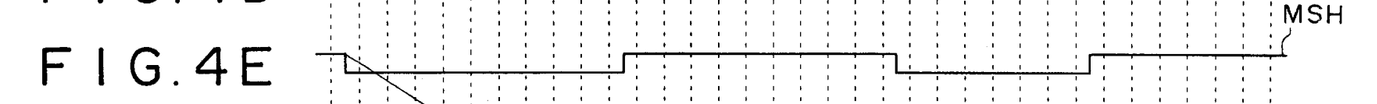

A flip-flop 25 latches the exclusive OR signal MS1 at timings of rise of the EFM signal S2 (FIG. 4E). In this case, according to the embodiment, the signal level of the modulating signal S3 is set to rise in correspondence with rise of the signal level of the EFM signal S2 and a pit is formed on the disk original board 2 in correspondence with the time period during which the signal level of the modulating signal S3 rises. Thereby, the flip-flop 25 samples a logical level of the exclusive OR signal MS1 at a timing in correspondence with a leading edge of each pit and holds a result of the sampling until a timing in correspondence with a leading edge of a successive pit.

Figure 4F:
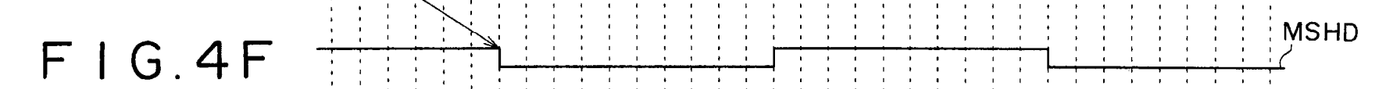

A delay circuit 26 delays a latch result MSH of the flip-flop 25 by a predetermined time period and outputs a delay signal MSHD (FIG. 4F). The delay time period is a time period required for processing by a 7T or more detecting circuit 27 and a time period of about 5 clocks of the channel clock CK.

Figure 4G:
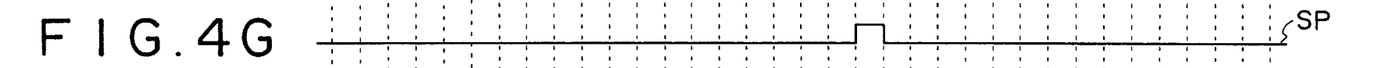
Figures 4H, 4I:
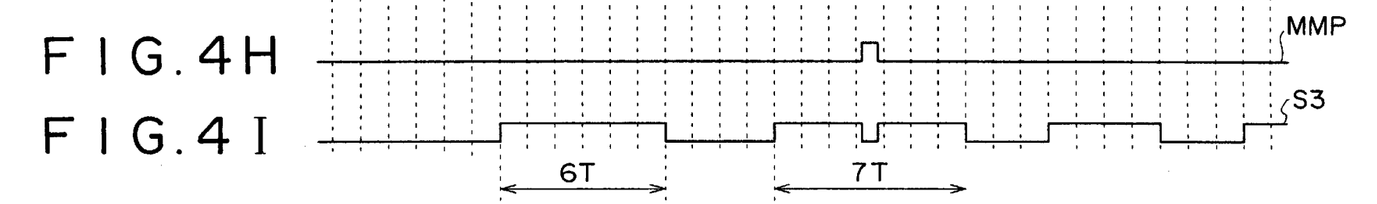
Figures 5, 6A:
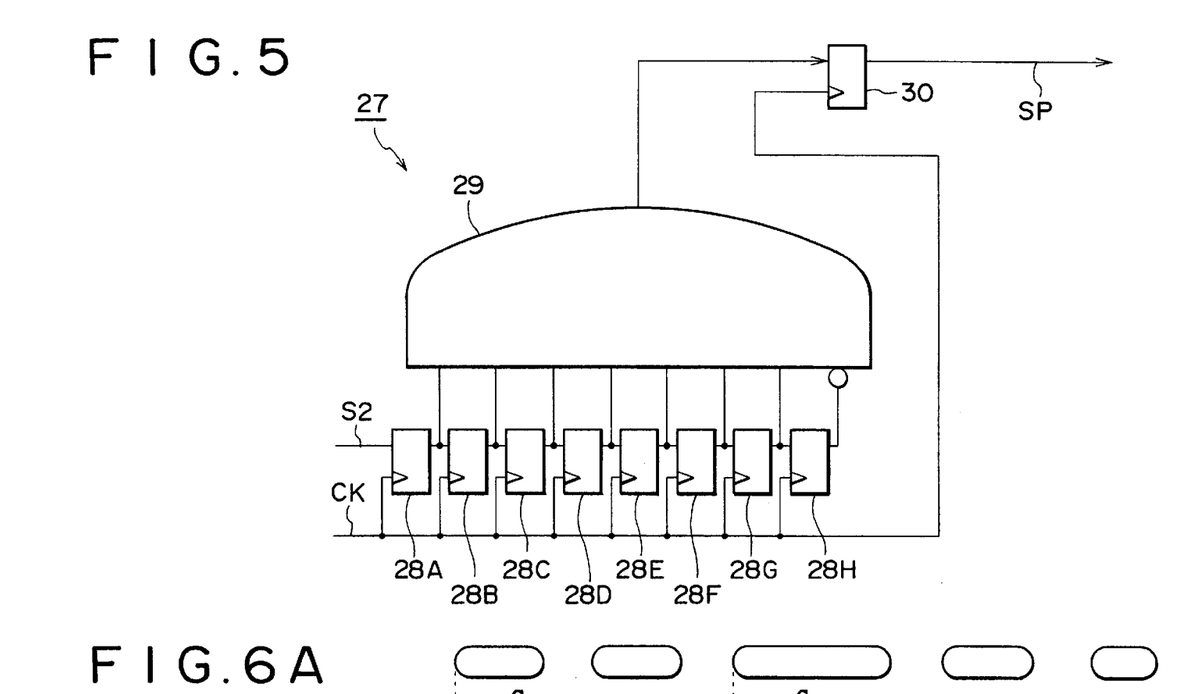
FIG. 5 is a block diagram showing a 7T or more detecting circuit of FIG. 4.
FIG. 6A and FIG. 6B are plane views showing shapes of pits of a compact disk constituted by the optical disk recording apparatus of FIG. 1.

The 7T or more detecting circuit 27 detects a pulse width of the EFM signal S2 and outputs a detection pulse SP having a width of 1 channel clock when the pulse width is 7T or more (FIG. 4G). That is, as shown by FIG. 5, in the 7T or more detecting circuit 27, 8 stages of latch circuits 28A, 28B, 28C, 28D, 28E, 28F, 28G and 28H latch and transmit successively the EFM signal S2 in synchronism with the channel clock CK.

An AND circuit 29 inputs in parallel latch outputs from the latch circuits 28A, 28B, 28C, 28D, 28E, 28F, 28G and 28H. In this case, the AND circuit 29 inverts the logical level of the latch output and inputs it only in respect of the latch circuit 28H at the final stage and outputs a signal of logical product of the parallel inputs. Thereby, in view of the EFM signal S2 by the channel clock CK period, only when 7 of logic 1 are consecutive from 1 of logic 0, that is, only when in respect of basic period T of the EFM signal S2, a pit of a period of 7T or more is formed, the AND circuit 29 outputs a logical product signal rising to logic 1.

A latch circuit 30 outputs the detecting pulse SP by latching an output from the AND circuit 29.

An AND circuit 32 outputs a signal of a logical sum of the detection pulse SP and the delay signal MSHD outputted from the delay circuit 26 (FIG. 3). A monostable multivibrator (MM) 33 outputs a modulation pulse MMP (FIG. 4H) having a predetermined pulse width shorter than 1 period of the channel clock CK with an output from the AND circuit 32 as a trigger. Further, in this case, the pulse width is set such that when irradiation of the laser beam L is temporarily stopped by the modulation pulse MMP, in a compact disk formed by the disk original board 2, the width of pit is reduced by the temporary stop and the degree of reduction is equal to about 10(%) of an average pit width.

A delay circuit 36 outputs the EFM signal S2 by delaying it by a time period of about 5 clocks and an exclusive OR circuit (XOR) 37 calculates exclusive OR of the EFM signal S2D (FIG. 4C) outputted from the delay circuit 36 and the modulation pulse MMP and forms a modulation signal S3 (FIG. 4I) constituted by modulating the EFM signal S2 by the disk identifying code SC1.

In this operation, a delay time period at the delay circuit 36 is selected such that in reproduction, at a pit having the period of 7T or longer, switching of logical level of the modulating signal S3 in correspondence with the modulation pulse MMP, does not effect influence on a timing of an edge by the EFM signal S2 in reproduction. Specifically, the delay time period is set such that switching of the logical level of the modulation signal S3 in correspondence with the modulation pulse MMP constitutes a timing separated from a timing of rise of the EFM signal S2 by a predetermined time period. According to the embodiment, the EFM signal S2 is delayed by a time period of about 5 clocks and corresponding rise of the EFM signal S2D is made to be prior to rise of the modulation pulse MMP by a time period of about 3T or more.

Figure 6B:
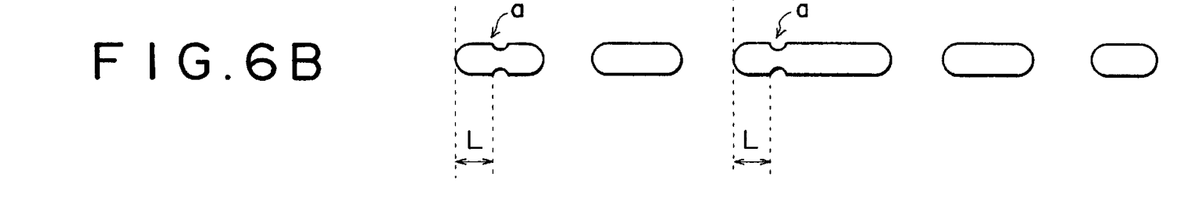

FIG. 6A and FIG. 6B are plane views showing shapes of pits of a conventional compact disk and a compact disk formed by a disk original board for comparison. According to the conventional disk (FIG. 6A), pits and the lands are simply repeatedly formed by lengths with a multiplication factor of an integer of 1 clock period T of the channel clock CK comprising the basic period in accordance with audio data. In contrast thereto, according to the compact disk of the embodiment (FIG. 6B) at a pit having a length of a period of 7T or higher among the pits, as shown by an arrow mark "a", the pit is formed such that a width of the pit is reduced locally in accordance with the disk identifying code SC1 by being separated from an edge of the pit by a predetermined distance L and the disk identifying code SC1 is recorded by the width of the pit.

Figure 7:
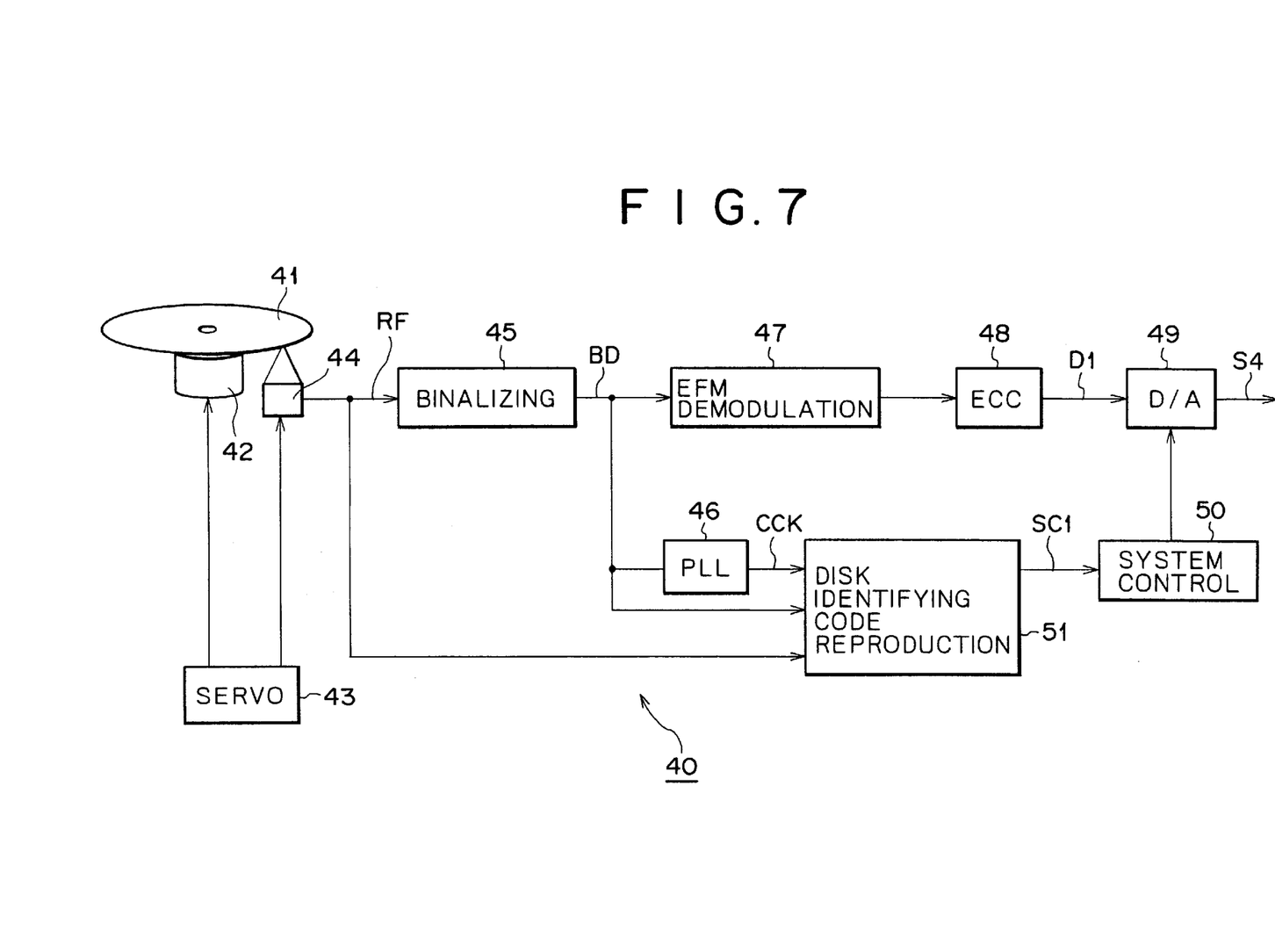
FIG. 7 is a block diagram showing a compact disk player for reproduction of the compact disk of FIGS. 6A and 6B.

FIG. 7 is a block diagram showing a compact disk player for reproducing a compact disk 41. In the compact disk player 40, a spindle motor 42 drives to rotate the compact disk 41 under a condition of constant linear velocity by control of a servo circuit 43.

An optical pick up 44 irradiates a laser beam to the compact disk 41, receives return beam and outputs a reproduction signal RF the signal level of which is changed in accordance with an optical amount of the return beam. In this case, according to the reproduction signal RF, the signal level is varied in correspondence with pits recorded on the compact disk 41. At this occasion, in the compact disk 41, by forming the pit such that the width of the pit is locally reduced by about 10(%) of an average width of the pit, the signal level of the reproduction signal RF is varied in accordance with the width of the pit. However, a reduced width portion is formed to separate from an edge of each pit by a predetermined distance such that no influence is effected on the timing of the edge by which a timing at which the reproduction signal RF crosses a reference level of binary value identification is maintained at a timing similar to that in the case in which the width of the pit is not formed narrowly.

Thereby, a binarizing circuit 45 binarizes the reproduction signal RF in accordance with a predetermined reference level and forms a binarized signal BD. By this operation, the degree of reducing locally the width of a pit in the compact disk 41 is 10(%) and therefore, in the binarized signal BD, the local reduction in the width of the pit cannot be detected.

A PLL circuit 46 operates with the binarized signal BD as a reference by which channel clock CCK of the reproduction signal RF is reproduced.

An EFM demodulating circuit 47 reproduces reproduction data in correspondence with the EFM signal S2 by successively latching the binarized signal BD with the channel clock CCK as a reference. Further, the EFM demodulating circuit 47 subjects the reproduction data to EFM demodulation, thereafter, partitions the demodulated data in an 8 bit unit with frame synchronization as a reference and deinterleaves a formed signal of 8 bit unit and outputs it to an ECC (Error Correcting Code) circuit 48.

The ECC circuit 48 corrects error of output data from the EFM demodulating circuit 47 based on an error correction code added to the output data by which audio data DI is reproduced and outputted.

A digital to analog conversion circuit (D/A) 49 subjects audio data outputted from the ECC circuit 48 to digital to analog conversion and outputs an audio signal S4 comprising an analog signal. In this case, the digital to analog conversion circuit 49 stops outputting the audio signal S4 when the compact disk 41 is determined to be constituted by illegal copying by control of a system control circuit 50.

The system control circuit 50 is constituted by a computer for controlling operation of the compact disk player 40. In making access to a lead in area, the system control circuit 50 determines whether the compact disk 41 is constituted by illegal copying based on the disk identifying code SC1 outputted from a disk identifying code reproduction circuit 51 and controls to stop the output of the audio signal S4 from the digital analog conversion circuit 49 when the compact disk 41 is determined to be constituted by the illegal copying.

The disk identifying code reproduction circuit 51 demodulates and outputs the disk identifying code SC1 from the reproduction signal RF.

Figure 8:
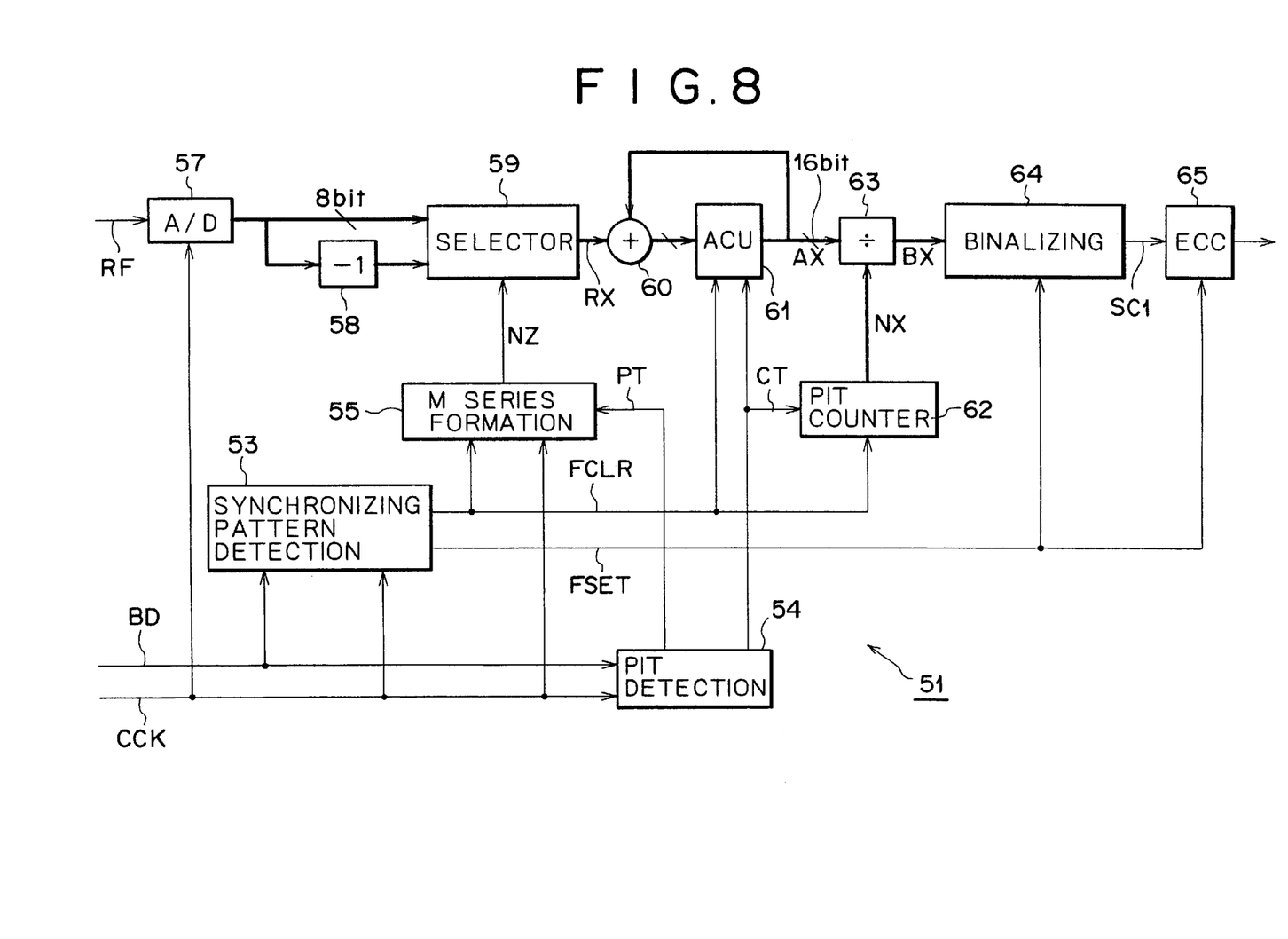
FIG. 8 is a block diagram showing a disk identifying code reproducing circuit of the compact disk player shown by FIG. 7.
Figure 9A:
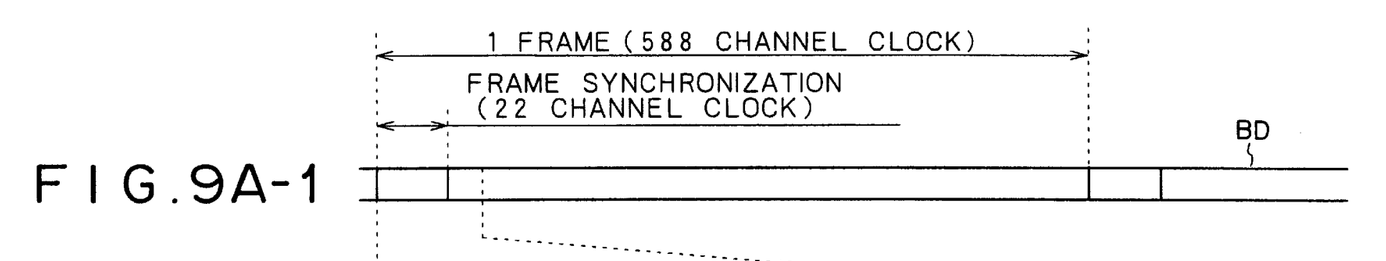
Figure 9A:
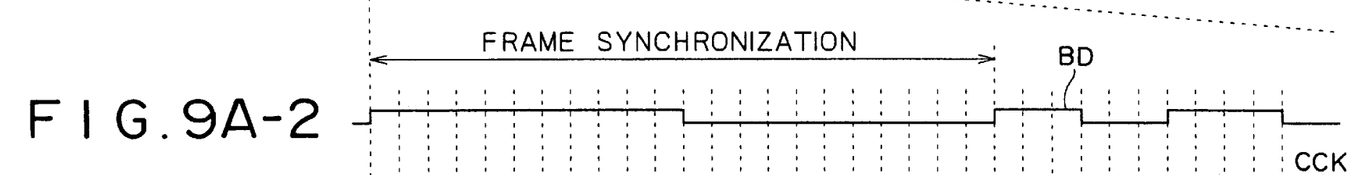
Figures 9B, 9C:
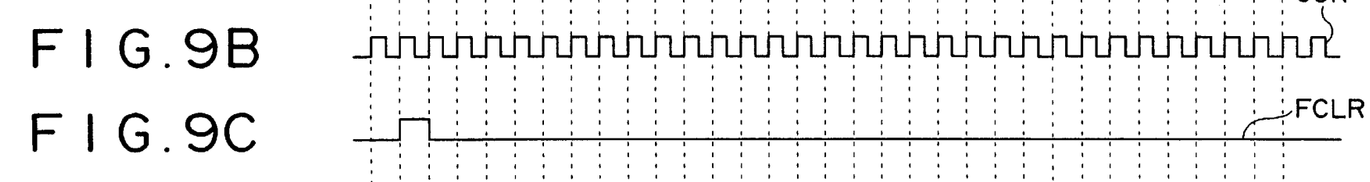
Figure 9D:
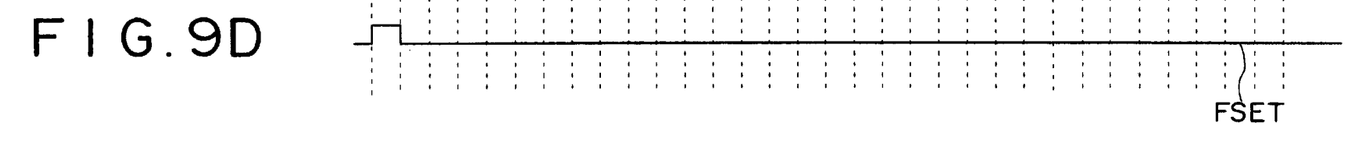

FIG. 8 is a block diagram showing in details the disk identifying code reproduction circuit 51. As shown by FIGS. 9A-1, 9A-2, 9B, 9C and 9D, in the disk identifying code reproduction circuit 51, a synchronizing pattern detecting circuit 53 successively latches the binarized signal BD (FIG. 9A-1 and FIG. 9A-2) with the channel clock CCK (FIG. 9B) as a reference and detects frame synchronization by determining consecutive logical levels thereof. Further, with the detected frame synchronization as a reference, the synchronism pattern detecting circuit 53 outputs a set pulse FSET at which the signal level rises during a time period of 1 channel clock CCK at which each frame is started and a clear pulse FCLR at which the signal level rises during a time period of 1 channel clock CCK successive to the set pulse FSET (FIG. 9D and FIG. 9C).

A pit detecting circuit 54 is constituted similar to the 7T or more detecting circuit 27 of the optical disk recording apparatus 1 (FIG. 5) and detects a timing of the binarized signal BD in correspondence with a pit having a length of a period of 7T or longer by successively transmitting the binarized signal BD in place of the FEM signal S2 with the channel clock CCK as a reference. Further, the pit detecting circuit 54 forms and outputs a rise signal PT at which the signal level rises at a timing at which the detected pit is started. Further, a gate signal CT at which the signal level rises with delay of a predetermined time period from the rise signal PT is outputted thereby. Further, the gate signal CT corresponds to the modulation pulse MMP of the second modulating circuit 7 in which different from the modulation pulse MMP, the signal level rises at each pit having a length of the period of 7T or longer.

An M series forming circuit 55 initializes address by the clear pulse FCLR and thereafter advances successively the address by the channel clock CCK to thereby make access to a built-in read only memory by which an M series signal in correspondence with the M series signal MS formed by the optical disk recording apparatus 1, is formed. Further, the M series forming circuit 55 latches and outputs the M series signal with the rise signal PT as a reference to thereby latch the M series signal at a timing of starting a pit having a length of the period of 7T or longer and thereafter outputs an M series latch signal MS constituted by holding the latched logical level until a time point of starting a consecutive pit having a length of the period of 7T or longer.

An analog to digital conversion circuit (A/D) 57 converts the reproduction signal RF in analog to digital conversion with the channel clock CCK as a reference and outputs a digital reproduction signal of 8 bits. A polarity reverting circuit (-1) 58 reverts the polarity of the digital reproduction signal and outputs it.

A selector 59 selects and outputs either of a digital reproduction signal directly inputted from the analog to digital conversion circuit 57 and a digital reproduction signal constituted by reverting the polarity which is inputted from the polarity reverting circuit 58 in accordance with the logical level of the M series latch signal MZ outputted from the M series forming circuit 55. That is, the selector 55 selects and outputs the digital reproduction signal which is directly inputted when the M series latch signal MZ is logic 1 and selects the digital reproduction signal the polarity of which is reverted when the M series latch signal MZ is conversely logic 0. Thereby, the selector 59 reproduces the logical level of the disk identifying code SC1 which is modulated by the M series signal MS by data of multiple values and outputs reproduction data RX constituted by the data of the multiple value.

An adder 60 is a digital adder of 16 bits for adding the reproduction data RX and output data AX from an accumulator (ACU) 61 and outputting the result of addition. The accumulator 61 is constituted by a memory of 16 bits for holding output data from the adder 60 and constitutes an accumulation adder along with the adder 60 by feeding back held data to the adder 60. That is, the accumulator 61 clears held content by the clear pulse FCLR and thereafter inputs output data from the adder 60 at a timing of the gate signal CT. Thereby, the adder 60 accumulates a logical value of the reproduction data RX reproduced by the selector 59 and outputs the accumulated value AX at each frame.

A pit counter 62 clears held content by the clear pulse FLCR and counts the gate signal CT to thereby count a number of pits which is accumulatingly added at the accumulator 61 and outputs a count value NX.

A dividing circuit (÷) 63 divides the accumulated value AX outputted from the accumulator 61 by the count value NX by which the logical value of the reproduction data RX reproduced by the selector 69 is averaged. A binarizing circuit 64 binarizes and outputs output data BX from the dividing circuit 63 by a predetermined reference value at a timing at which the set pulse FSET rises. Thereby, the reproduction data RX of the disk identifying code SC1 reproduced by the selector 59 is converted into the disk identifying code FC1 having a binary value.

An ECC circuit 65 subjects the disk identifying signal SC1 to error correction processing by an error correction code added to the disk identifying code SC1 and outputs it.

(1-2) Operation of First Embodiment According to the above-described constitution, in steps of fabricating the compact disk 41 according to the embodiment, in the case of the optical disk recording apparatus 1 (FIG. 1), the disk original board 2 is successively exposed by the digital audio signal D1 outputted from the digital audio tape recorder 10 to thereby form a mother disk and thereafter, the compact disk 41 is formed from the mother disk.

In exposing the disk original board 2, in the modulating circuit 11, with 1 period T of the channel clock as the basic period, the digital audio signal D1 is converted into the EFM signal S2 in which the signal level is switched at a period which is larger than the basic period T by a multiplication factor of an integer. Further, in the lead in area, in place of the digital audio signal D1, a data row of TOC is similarly converted into the FEM signal S2.

Further, the FEM signal S2 is converted into the modulating signal S3 via the second modulating circuit 7, the optical modulator 6 is driven by the modulating signal S3 and go: the signal is recorded on the disk original board 2. Thereby, the digital audio signal D1 is recorded on the disk original board 2 by repeating pits and lands having a length which is larger than the basic length in correspondence with one period of the channel clock CK by a multiplication factor of an integer along with the data row of TOC.

In converting the EFM signal S2 into the modulating signal S3, in a region other than the lead in area, the modulating signal S3 is formed in correspondence with the signal level of the EFM signal S2 whereas in the lead in area, the modulating signal S3 is formed by locally switching the signal level of the EFM signal S2 whereby in a pit row formed on the disk original board 2, a pit having a locally narrow width is formed. Thereby, the pit width is modulated and the disk identifying code SC1 is recorded on the disk original board 2.

That is, in the disk identifying code generating circuit 12, the frame clock FCK is counted by the N-adic counter 12A and the disk identifying code table 12B is made access by the count vale by which the disk identifying code SC1, an error correction code of the disk identifying code SC1 and so on are formed by a binary number having a low frequency which is constituted by being allocated with 1 bit in 1 frame.

Further, in the M series generating circuit 23 of the second modulating circuit 7 (FIG. 3), there is formed the random number data MS of the M series which is repeated at the frame period in synchronism with the channel clock CK and the exclusive OR of the random number data MS of the M series and the disk identifying code SC1 is obtained at the exclusive OR circuit 24. Thereby, the disk identifying code SC1 is modulated by the random number data MS and since logic 1 and logic 0 emerge at equal probabilities in the random numbers of the M series and therefore, the disk identifying code SC1 is modulated into the exclusive OR signal MS1 in which logic 1 and logic 0 emerge similarly at equal probabilities.

Further, at the flip-flop circuit 25, the exclusive OR signal MS1 is latched at a leading edge of the EFM signal S2 in correspondence with an edge of each pit. Further, at the 7T or more detecting circuit 27, there is detected a rise of the signal level of the EFM signal S2 in correspondence with a pit having a period of 7T or more in respect of the basic period T and by the AND circuit 32, a result of latch of the flip-flop circuit 25 in correspondence with the rise of the signal level is selected. Thereby, the monostable multivibrator 33 is driven by an output from the AND circuit 32 and the signal level of the EFM signal S2 is locally switched at the exclusive OR circuit 37 by an output from the monostable multivibrator 33.

Thereby, at a pit having a period of 7T or more, the pit width of the disk identifying code SC1 is locally reduced and is recorded on the disk original board 2. Further, at the disk original board 2, a pit is partially reduced when the logical product of the M series random number data MS and the disk identifying code SC1 is logic 1 and the length of the pit is 7T or longer and a pit row is successively formed.

Further, in forming a pit having a narrow width by forming the modulating signal S3 by switching the logical level of the FEM signal S2 in this way, in respect of the modulation pulse MMP outputted from the monostable multivibrator 33, the FEM signal S2 is supplied to the exclusive OR circuit 37 while being delayed by the delay circuit 36 by which switching of the logical level of the modulating signal S3 is set such that no influence is effected on a timing of an edge by the EFM signal S2 in reproduction.

That is, on the premise of reducing the pit width in a pit having a period of 7T or more, switching of the logical level of the modulating signal S3 in correspondence with the modulation pulse MMP, is set to be at a timing separated from a timing of rise of the FEM signal S2 by a predetermined time period (which corresponds to the distance L from an edge of a pit in FIGS. 6A and 6B) and rise of a corresponding one of the EFM signal S2D is advanced compared with rise of the modulation pulse MMP by a period of about 3T or more.

In this way, the disk identifying code SC1 is recorded such that no influence is effected on edge information of each pit constituting a reference of reproducing the digital audio signal and the TOC data.

Further, the pulse width of the modulation pulse MMP outputted from the monostable multivibrator 33 is set to be a length shorter than 1 period of the channel clock CK by which the width of a pit is reduced to be smaller than an average width of a pit by 10(%) and a pit having a locally narrow width is formed by which erroneous identification of a binary value of the reproduction signal RF caused by recording the disk identifying code SC1 is prevented.

Further, by recording the disk identifying code SC1 by locally reducing the pit width by 10(%) and by modulating the disk identifying code SC1 by the M series random number data MS in which logic 1 and logic 0 emerge at equal probabilities, a change in the reproduction signal RF caused by a change in the pit width is observed as if it is noise mixed to the reproduction signal RF whereby the disk identifying code SC1 can be made difficult to observe and discover. Further, the disk identifying code SC1 can also be made difficult to copy.

Further, in addition thereto, by allocating 1 bit of the disk identifying code SC1 to 1 frame, even when the reproduction signal is varied by noise or the like, the disk identifying code SC1 can firmly be reproduced.

That is, according to the compact disk 41 (FIG. 7) formed in this way, in the compact disk player 40, by detecting the reproduction signal RF the signal level of which is varied in accordance with an optical amount of return beam obtained by irradiating laser beam, the signal level of the reproduction signal RF is varied in accordance with the pit width and the reproduction signal RF is binarized by the binarizing circuit 45. Successively, the binarized signal BD is subjected to binary value identification, thereafter, to EFM demodulation and deinterleaving by the EFM demodulating circuit 47 and subjected to error correction processing by the ECC circuit 48 by which the digital audio signal D1 is reproduced.

At this occasion, in the compact disk 41, a local reduction in the width of a pit is caused at a pit having a period of 7T or more and the pit width is reduced while the pit is separated from an edge of a pit (both of a leading edge and a trailing edge) by a distance in correspondence with a period of 3T or more by which a beam spot produced by laser beam is made to scan the edge of the pit and a portion where the pit width is reduced at different timings whereby in the reproduction signal RF, an influence constituted by reducing locally the pit width is avoided. That is, in the compact disk 41, a change in the signal level at a vicinity of each edge caused by narrowing the width of the pit is prevented whereby even in the case of a compact disk where the disk identifying code is recorded, the disk can correctly be reproduced by a normal compact disk player.

In reproducing the digital audio signal D1 executed in this way, in the compact disk 41, the disk identifying code SC1 which is recorded in accordance with the pit width in the lead in area is reproduced beforehand and when the disk identifying code SC1 cannot be correctly reproduced, the digital to analog conversion processing by the digital to analog conversion circuit 49 is controlled to stop as illegal copying.

That is, in reproducing the disk identifying code SC1 in the lead in area (FIG. 8), in the compact disk 41, frame synchronization is detected at the synchronizing pattern detecting circuit 53 and the random number data MZ in correspondence with the M series random number data in recording is formed at the M series random number forming circuit 55 with detection of the frame synchronization as a reference.

Further, the reproduction signal RF is converted into the digital reproduction signal by the analog to digital conversion circuit 57 and the digital reproduction signal or the digital reproduction signal which is constituted by reverting the polarity is selected by the selector 59 with the M series random number data MZ as a reference by which the reproduction data RX constituted by expressing the logical level of the disk identifying code SC1 by data of multiple values is reproduced.

According to the reproduction data RX, the SN (Signal to Noise) ratio is extremely deteriorated in view of 1 sample unit since the pit width is reduced only by 10(%). In the case of the compact disk 41, the reproduction data RX is accumulated by a unit of a frame by the accumulator 61 and the adder 60 and thereafter averaged by being divided by the dividing circuit 63 whereby the SN ratio is improved. In this way, the output data BX from the dividing circuit 63 is binarized by the binarizing circuit 64, the disk identifying code SC1 is demodulated, thereafter, subjected to error correction processing by the ECC circuit 65 and is outputted to the system control circuit 50.

(1-3) Effect of First Embodiment

According to the above-described constitution, in respect of a pit having a length in correspondence with a period of 7T of more, by varying the pit width at a timing separated from a timing in correspondence with an edge of a pit by a predetermined distance based on the disk identifying code SC1, the disk identifying code SC1 can be recorded reproducibly by using an optical pick up for reproducing the digital audio signal D1 without effecting influence on reproduction of the digital audio signal D1 constituted by a pit row. Thereby, illegal copying can be excluded by utilizing the disk identifying code SC1.

Further, in this way, at the second modulating circuit, a pit having a length in correspondence with the period of 7T or more is detected and the modulating signal S3 is formed by reverting the signal level of the EFM signal S2 at a timing separated from the timing in correspondence with the edge of the detected pit by a predetermined time period in accordance with the disk identifying code SC1 by which the disk identifying code SC1 can be recorded simply, conveniently and firmly without effecting influence on the reproduction of the digital audio signal D1 constituted by the pit row.

Further, by forming the modulating signal S3 by modulating the disk identifying code SC1 by the M series random number data MS, the disk identifying code SC1 can be recorded such that it is difficult to identify from noise and the disk identifying code SC1 can be made difficult to discover or analyze. Further, in reproduction operation, the disk identifying code SC1 can be reproduced by effectively avoiding influence of noise.

Further, by setting a time period in which the signal level of the modulating signal S3 is reverted and the pit width is narrowed to a time period which is shorter than 1 period T of the channel clock CK comprising the basic period, similarly, the disk identifying code SC1 can be recorded such that it is difficult to identify from noise and the disk identifying code SC1 can be made difficult to discover or analyze.

Further, by also setting the change in the pit width to 10(%) of an average width of a pit, similarly, the disk identifying code SC1 can be recorded such that it is difficult to identify from noise and the disk identifying code SC1 can be made difficult to discover or analyze.

Further, in a compact disk player, the disk identifying code SC1 is demodulated by detecting the signal level of the reproduction signal RF and influence of noise mixed to the disk identifying code is removed by detecting an average value of the signal level by which the disk identifying code SC1 which is recorded such that it is difficult to identify from noise can firmly be reproduced.

Further, in this case, by constituting averaging means by the accumulating adder constituted by the accumulator 61 and the adder 60 and a count value by the pit counter 62, the disk identifying code SC1 which is recorded by being allocated to pits each having a period of 7T or more in which a number of times of emergence in 1 frame is uncertain, can firmly be reproduced.

Further, by selectively processing the digital reproduction signal by the M series random number data MZ in the selector 59, the disk identifying code SC1 is reproduced by which the disk identifying code SC1 which is recorded to be difficult to discover or analyze can firmly be reproduced.

(2) Other Embodiments

Further, although according to the above-described embodiment, a description has been given of the case in which the disk identifying code is modulated by the M series random number data in synchronism with the channel clock CK, the present invention is not limited thereto but, for example, by supplying the EFM signal S2 to the M series generating circuit 23 in place of the channel clock CK, the M series random number data may be formed in synchronism with the EFM signal S2.

Further, although according to the above-described embodiment, a description has been given of the case in which the disk identifying code is recorded by modulating the pit width in respect of a pit having a period of 7T or more, the present invention is not limited thereto but similar effect can be achieved even by modulating the pit width in respect of the pit having a period of 6T or more when a reproduction system is provided with sufficient allowance in respect of jitter of a reproduction signal, and the like.

Figure 10A:
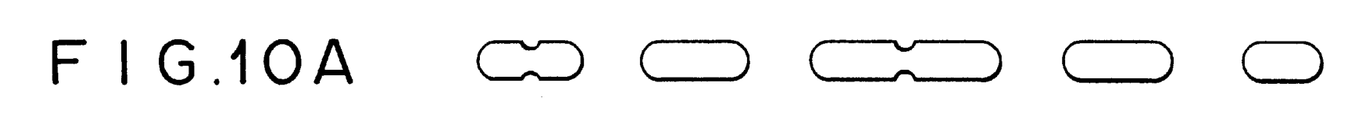
FIGS. 10A, 10B, 10C and 10D are plane views showing shapes of pits of a compact disk according to other embodiment.

Further, although according to the above-described embodiment, a description has been given of the case in which the pit width is reduced while being separated from an edge of a pit by a predetermined distance, the present invention is not limited thereto but as shown by FIG. 10A, the pit width may be reduced at center of each pit in respect of a pit having a predetermined length or more.

Further, although according to the above-described embodiment, a description has been given of the case in which the pit width is modulated by locally reverting the signal level of the EFM signal S2, the present invention is not limited thereto but, for example, the pit width may be modulated by modulating an optical amount of laser beam.

Figure 10B:
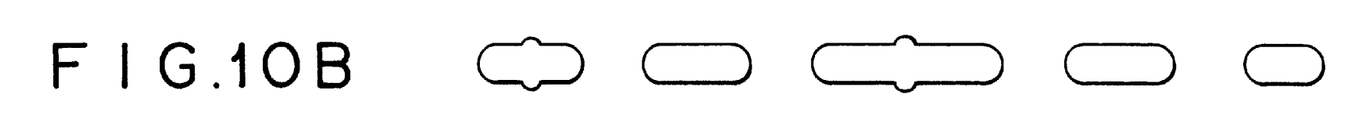

Thereby, as shown by FIG. 10B, the pit width can also be modulated such that the pit width is increased locally.

Figure 10C:
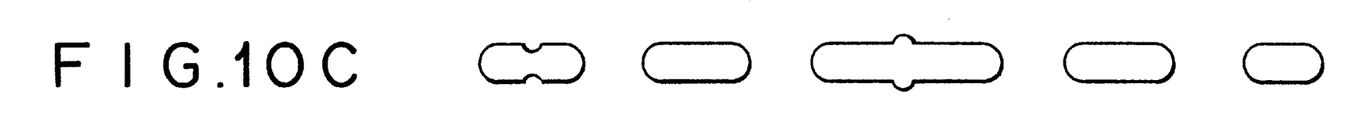
Figure 10D:
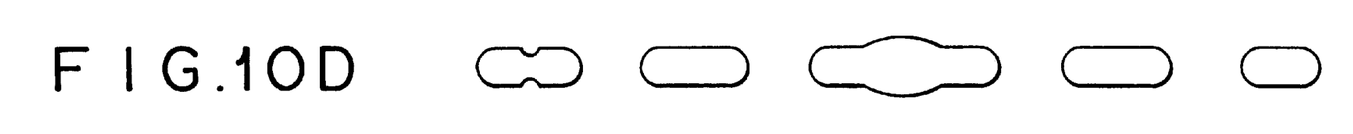

Further, as shown by FIG. 10C, the disk identifying code can also be recorded by three values by locally increasing or reducing the pit width and the disk identifying code can also be recorded by recording multiple values larger than three values by further setting a degree of the increase and a degree of the reduction in steps. Further, as shown by FIG. 10D, sub data can also be recorded by varying the pit width by a time period which is longer than 1 period of the channel clock.

Further, although according to the above-described embodiment, a description has been given of a case in which the disk identifying code of 1 bit is allocated and recorded to 1 frame, the present invention is not limited thereto but, for example, in respect of a pit having a predetermined length or more, various allocating methods are applicable as in a case in which a disk identifying code of 1 bit is allocated at every predetermined number, a case in which a disk identifying code of plural bits is allocated successively and circulatingly to a pit having a predetermined length or more and so on. Further, when a disk identifying code of 1 bit is allocated at every predetermined number, the pit counter 62 and the dividing circuit 63 on the reproducing side can be omitted.

Further, although according to the above-described embodiment, a description has been given of the case in which the disk identifying code is recorded by the pit width, the present invention is not limited thereto but various data necessary for deciphering encipherment may be recorded by the pit width as in a case in which a digital audio signal which is enciphered by pits and lands is recorded and key information necessary for deciphering the encipherment is recorded by the pit width, in a case in which data necessary for selecting and decoding key information is recorded by the pit width and so on.

Further, although according to the above-described embodiment, a description has been given of the case in which in contrast to a main data row constituted by pits and lands, a sub data row is recorded by modulating the pit width of the lead in area, the present invention is not limited thereto but the sub data can be recorded by modulating the pit width in various regions such as user s area or the like. Further, in these cases, the pit width may be changed also in a region in which no sub data is recorded by which a region in which the sub data is recorded may be made difficult to discover.

Further, although according to the above-described embodiment, a description has been given of the case in which the digital audio signal and the disk identifying code are reproduced by respectively binarizing them, the present invention is not limited thereto but, for example, various identifying methods can finally be applied as in Viterbi demodulation or the like.

Further, although according to the above-described embodiment, a description has been given of the case in which the digital audio signal is recorded by subjecting it to EFM modulation, the present invention is not limited thereto but is widely applicable to various modulations such as 1–7 modulation, 8–16 modulation, 2–7 modulation and so on.

Further, although according to the above-described embodiment, a description has been given of the case in which desired data is recorded by pits and lands, the present invention is not limited thereto but is applicable widely also to a case in which the desired data is recorded by marks and spaces.

Further, although according to the above-described embodiment, a description as been given of the case in which an audio signal is recorded by applying the present invention to a compact disk and its peripheral devices, the present invention is not limited thereto but is applicable widely to various optical disks and their peripheral devices such as a video disk and so on.

As has been described, according to the present invention, by changing a width of a pit or a mark at a timing which does not effect influence on positional information of an edge, a sub data row can be recorded reproducibly by an optical pick up for reproducing a main data row without effecting any influence on reproduction of the main data row constituted by a pit row or a mark row.

What is claimed is:

1. An optical disk recording apparatus for forming a first modulating signal whose signal level switches at each of a plurality of time periods in accordance with a main data row representing a first data, each of said time periods being an integer multiple of a predetermined basic period of time, wherein an optical beam that is controlled in accordance with the first modulating signal is transmitted onto a disk-like record medium to successively form pits and lands in accordance with each of said periods, said apparatus comprising:

first modulating signal forming means for forming the first modulating signal in accordance with the main data row;

pulse width detecting means for detecting a pulse width of the first modulating signal and outputting a result of the detection of the pulse width;

modulating signal processing means for forming a double modulating signal by modulating the signal level of the first modulating signal at said predetermined time period in accordance with a subcode and the detection of the pulse width;

means for determining whether a pit is of a predetermined length or longer;

means for determining a predetermined distance from an edge of the pit corresponding to a predetermined time period;

record beam modulating means for modulating the optical beam in accordance with the double modulating signal; and means for changing a width of the pit at said predetermined distance based on the subcode representing a second data; and an optical system for transmitting the optical beam onto the record medium.

2. The optical disk recording apparatus according to claim 1, wherein the modulating signal processing means forms the double modulating signal by modulating the subcode by M series quasi-random numbers repeating a pattern within a predetermined period of time.

3. The optical disk recording apparatus according to claim 1, wherein each of said predetermined time periods is substantially equal to a timing corresponding with a distance at the center of each of said pits.

4. The optical disk recording apparatus according to claim 1, wherein the signal level of the first modulating signal is modulated for a time period shorter than the basic period of time.

5. The optical disk recording apparatus according to claim 1, wherein the width of the pit is changed in accordance with the modulation of the subcode by a plurality of quasi-random numbers repeating a pattern within a predetermined period of time.

6. The optical disk recording apparatus according to claim 1, wherein the predetermined distance is about 6 times as large as the length of the basic period.

7. The optical disk recording apparatus according to claim 1, wherein the subcode includes data for identifying the disk-like shaped record medium.

8. The optical disk recording apparatus according to claim 1, wherein the main data row comprises an enciphered data row and the subcode comprises a data row necessary for deciphering the enciphered main data row.

9. An optical disk recording method for recording a main data row representing a first data by successively forming pits and lands of a length that is an integer multiple of a predetermined basic length, comprising the steps of:
  determining a predetermined distance from an edge of the pit corresponding to a predetermined time period, the pit being of a predetermined length or more;
  forming a first modulating signal level that switches at a period of time corresponding to a distance larger than said predetermined basic length;
  detecting a pulse width of the first modulating signal;
  forming a double modulating signal by modulating the signal level of the first modulating signal as a function of the detected pulse width and a subcode;
  modulating an optical beam in accordance with the double modulating signal;
  changing a width of the pit at the predetermined distance based on subcode representing a second data; and
  transmitting the optical beam to a disc-like shaped record medium.

10. The optical disk recording method according to claim 9, wherein the double modulating signal is formed by modulating the subcode by M series quasi-random numbers repeating a pattern within a predetermined period of time.

11. The optical disk recording method according to claim 9, wherein the double modulating signal is formed by modulating the signal level of the first modulating signal during a predetermined modulating time period corresponding with spacing between the centers of consecutive pits, each pit being said predetermined length or more.

12. The optical disk recording method according to claim 9, wherein the double modulating signal is formed by modulating the signal level of the first modulating signal for a predetermined modulating time period which is shorter than a period of time corresponding to said basic length.

13. The optical disk recording method according to claim 9, wherein the width of the pit is changed in accordance with the modulation of the subcode by a plurality of quasi-random numbers repeating a pattern within a predetermined period of time.

14. The optical disk recording method according to claim 9, wherein said predetermined length is approximately 6 times as long as said predetermined basic length.

15. The optical disk recording method according to claim 9, wherein the subcode identifies the recording medium.

16. The optical disk recording method according to claim 9, wherein the main data row is enciphered, and the subcode is necessary for deciphering the enciphered main data row.

17. An optical disk recorded with a main data row of successively formed pits and lands, each being a length that is an integer multiple of a predetermined basic length, and a subcode recorded by modulating a width of at least one pit having at least a predetermined length at a portion of said pit which is a predetermined distance from the edge of the pit, said pits and lands being formed by:
  forming a first modulating signal in accordance with said main data row;
  detecting pulse width of the first modulating signal and outputting a result of the detection of the pulse width;
  forming a double modulating signal by modulating the signal level of the first modulating signal at a predetermined timing in accordance with the subcode and the detection of said pulse width;
  determining whether a pit is of a predetermined length or longer;
  determining a predetermined distance from an edge of the pit corresponding to a predetermined time period;
  modulating the optical beam in accordance with the double modulating signal; and
  changing a width of said pit at said predetermined distance based on the subcode representing a second data.

18. The optical disk according to claim 17, wherein the portion of said pit that has its width modulated is positioned at a center of the pit.

19. The optical disk according to claim 17, wherein the width of the pit is modulated by 10% or less of an average width of the pit.

20. The optical disk according to claim 17, wherein the subcode is modulated by quasi-random numbers repeating a pattern within a predetermined period of time.

21. The optical disk according to claim 17, wherein the subcode identifies a record medium.

22. The optical disk according to claim 17, wherein the main data row is enciphered, and the subcode is necessary for deciphering the enciphered main data row.

23. An optical disk reproduction apparatus for reproducing a data row recorded on an optical disk by detecting a reflected optical beam to produce a reproduction signal whose signal level changes in accordance with the reflected beam, said data row having been formed by:
  forming a first modulating signal in accordance with a main data row;
  detecting pulse width of the first modulating signal and outputting a result of the detection of the pulse width;
  forming a double modulating signal by modulating the signal level of the first modulating signal at a predetermined timing in accordance with a subcode and the detection of said pulse width;
  determining whether a pit is of a predetermined length or longer;
  determining a predetermined distance from an edge of the pit corresponding to a predetermined time period;
  modulating an optical beam in accordance with the double modulating signal; and
  changing a width of said pit at said predetermined distance based on the subcode representing a second data;
said optical disk reproduction apparatus comprising:
  clock reproducing means for reproducing a clock signal in accordance with the reproduction signal;
  first reproducing means for reproducing said main data row, the clock signal being used as a timing reference to aid in the detection of the binary value of the reproduction signal;
  second reproducing means for reproducing said subcode by processing the reproduction signal with the clock signal being used as a timing reference, said second reproducing means including:

signal level detecting means for detecting a signal level of the reproduction signal;

averaging means for detecting and outputting an average value of the detected signal level; and means for reproducing said subcode by identifying the average value of the detected signal level.

24. The optical disk reproduction apparatus according to claim 23, wherein the averaging means comprises:

accumulating means for accumulating the result of the detected signal level and outputting an accumulated value;

counting means for counting the number of accumulation operations performed by the accumulating means and outputting a count value; and dividing means for dividing the accumulated value by the count value and outputting the average value.

25. The optical disk reproduction apparatus according to claim 23, wherein the averaging means averages selectively the detected signal level at a time point substantially at a center of a predetermined time period in which the signal level of the reproduction signal changes from a predetermined reference level.

26. The optical disk reproduction apparatus according to claim 23, wherein the signal level detecting means reproduces the subcode by selectively demodulating the reproduction signal in accordance with a sequence of quasi-random numbers repeating a pattern within a predetermined period of time.

27. The optical disk reproduction apparatus according to claim 23, wherein reproduction of the main data row is selectively stopped based upon information contained within the subcode.

28. The optical disk reproduction apparatus according to claim 23, wherein the main data row is enciphered and is deciphered based on the subcode.

* * * * *